(12) United States Patent
Hsu et al.

(10) Patent No.: US 10,427,540 B2
(45) Date of Patent: Oct. 1, 2019

(54) SELF PROPELLED BATTERY COOLING SYSTEM TO EXTEND THE RIDE-RANGE OF AN ELECTRIC BIKE

(71) Applicant: GM Global Technology Operations LLC, Detroit, MI (US)

(72) Inventors: Chih-Cheng Hsu, Bloomfield Township, MI (US); Alexander M. Bilinski, Avoca, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 15/411,305

(22) Filed: Jan. 20, 2017

(65) Prior Publication Data
US 2017/0253141 A1    Sep. 7, 2017

Related U.S. Application Data

(60) Provisional application No. 62/301,703, filed on Mar. 1, 2016.

(51) Int. Cl.
*H01M 10/625*    (2014.01)
*B60L 11/18*    (2006.01)
*H01M 10/613*    (2014.01)
*H01M 10/6563*    (2014.01)
*B60K 1/04*    (2019.01)
*B62M 6/55*    (2010.01)
*B62M 6/90*    (2010.01)
*F04D 25/04*    (2006.01)
*H01M 2/10*    (2006.01)
*B60L 58/26*    (2019.01)
*B60K 1/00*    (2006.01)
(Continued)

(52) U.S. Cl.
CPC ............ *B60L 11/1874* (2013.01); *B60K 1/04* (2013.01); *B60L 58/26* (2019.02); *B62M 6/55* (2013.01); *B62M 6/90* (2013.01); *F04D 25/04* (2013.01); *H01M 2/1077* (2013.01); *H01M 10/613* (2015.04); *H01M 10/625* (2015.04); *H01M 10/6563* (2015.04); *B60K 11/06* (2013.01); *B60K 2001/005* (2013.01); *B60Y 2200/13* (2013.01); *B62K 15/006* (2013.01); *H01M 10/425* (2013.01); *H01M 2220/20* (2013.01)

(58) Field of Classification Search
CPC .......................... H01M 10/613; H01M 10/625
See application file for complete search history.

(56) References Cited

U.S. PATENT DOCUMENTS

2015/0214813 A1*   7/2015   Timonen ................... B62M 6/55
                                                  310/67 R

FOREIGN PATENT DOCUMENTS

CN          2643017 Y       9/2004
CN          101704343   *   5/2010
(Continued)

OTHER PUBLICATIONS

State Intellectual Property Office of the People's Republic of China, Office Action for Chinese Patent Application No. 201710090365.1 dated Feb. 2, 2019.

*Primary Examiner* — Olatunji A Godo
(74) *Attorney, Agent, or Firm* — Lorenz & Kopf, LLP

(57) ABSTRACT

A product may include a battery cell, and a housing may contain the battery cell. A cooling assembly may include an impeller that may circulate air in the housing. A turbine may be connected with the impeller so that the turbine and impeller may rotate together.

20 Claims, 2 Drawing Sheets

(51) Int. Cl.
*H01M 10/42* (2006.01)
*B62K 15/00* (2006.01)
*B60K 11/06* (2006.01)

(56) References Cited

FOREIGN PATENT DOCUMENTS

| | | |
|---|---|---|
| CN | 101704343 A | 5/2010 |
| CN | 101806481 A | 8/2010 |
| CN | 102069720 A | 5/2011 |

* cited by examiner

SELF PROPELLED BATTERY COOLING SYSTEM TO EXTEND THE RIDE-RANGE OF AN ELECTRIC BIKE

CROSS-REFERENCE TO RELATED APPLICATIONS

This application claims the benefit of U.S. Provisional Application No. 62/301,703 filed Mar. 1, 2016.

TECHNICAL FIELD

The field to which the disclosure generally relates includes cycles, and more particularly, includes cycles with a battery powered system.

BACKGROUND

An electric cycle may have various wheel arrangements and may include an on-board electric motor that can be used for propulsion of the cycle.

SUMMARY OF ILLUSTRATIVE VARIATIONS

A number of illustrative variations may involve a product that may include a battery cell. A housing may contain the battery cell. A cooling assembly may include an impeller that may circulate air in the housing. A turbine may be connected with the impeller so that the turbine and impeller may rotate together.

A number of additional variations may involve a product that may include a battery pack that may contain a number of battery cells. A housing may receive the battery pack. A plenum space may be open and may be defined in the housing. An impeller may be positioned in the plenum space. A turbine may be positioned outside the housing and may be connected with the impeller so that rotation of the turbine may cause rotation of the impeller to circulate air in the housing.

A number of other variations may involve a product that may include an electric cycle that may have a driven road wheel. A power unit may be connected to power the road wheel in at least a forward direction. A battery pack may be connected to the power unit as a source of electric power. An impeller may be positioned to circulate air over the battery pack. A turbine may be connected with the impeller so that operation of the electric cycle in the forward direction may cause air to move over the turbine inducing rotation thereof. The turbine may provide the only motive force to rotate the impeller.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
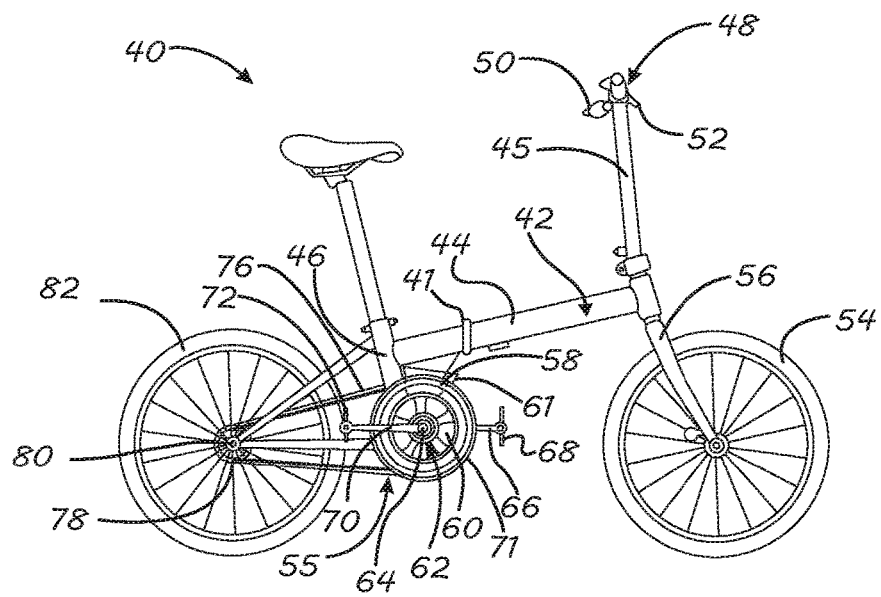
FIG. 1 illustrates an electric cycle according to a number of variations.

FIG. 1 illustrates a number of variations which may include an electric cycle 40. In any of a number of variations, the electric cycle 40 may include a frame 42 which may include a main tube 44 connected to a seat tube 46. The main tube 44 may include a hinged joint 41 to enable folding the frame 42, so that the electric cycle 40 may be more easily transported and stored. A steering tube 45 may extend from the main tube 44. The steering tube 45 may be operatively connected to a front fork 56 which may be attached to a front wheel 54. Handlebars 48 may be attached to the steering tube 45 and may be used to control the direction of the front wheel 54 by way of the front fork 56. Control levers 50 may be provided on the handlebars 48 and may be constructed and arranged to communicate with one or more input or control devices, and/or a motor. The one or more electronic control devices may include electronic processing components to receive input signals and to send out signals to control various components of the electric cycle 40, which may include sending output signals to control operation of an electric motor that may be associated with a power unit 60. In a number of variations, the one or more electronic control devices may include memory, a processor and software and/or hardware to process input signals and generate output signals, and may include formulas, lookup tables or other means for comparing and processing data. The one or more electronic control devices may be associated with a circuit unit 124 (shown in FIG. 2), which may be provided in a housing 130 along with a battery pack 118 (also shown in FIG. 2), and may include power electronics including an inverter that changes direct current from the battery to alternating current.

The electric cycle 40 may also include a propulsion system 55 that may include the power unit 60. The propulsion system 55 may also include a crank assembly 62 which may include a crankshaft 64 that may be connected with a first pedal assembly 66 and a second pedal assembly 70. The first pedal assembly 66 may include a first foot pedal 68, and the second pedal assembly 70 may include a second foot pedal 72. A linked element 71, which may be a sprocket or a pulley or another device for linking with the drive wheel 82, may be operatively connected to the crankshaft 64 for driving a linking member 76. The linking member 76 may be a chain or belt or another link suitable for engaging the linked element 71 and may be operatively connected to a rear linked element 78 which may be operatively connected to a hub 80 of the drive wheel 82. The drive wheel 82 may be a road wheel in-that it contacts the surface upon which the electric cycle 40 operates. The linked element 78 may be a sprocket or pulley or another device suitable for engaging with the linking member 76.

The electric cycle 40 may be constructed and arranged to allow a rider to rotate a first and second pedal assembly 66, 70 to power the electric cycle 40. A rider may use a pedal force-based propulsion system with the first and second pedal assemblies 66, 70 so that a rider may provide input commands by applying a force to a first foot pedal 68 attached to the first pedal assembly 66 or a second foot pedal 72 attached to the second pedal assembly 70 in the clockwise or counter clockwise direction to command propulsion of the electric cycle 40. The electric cycle 40 may be a bicycle, tricycle, or four-wheel electric cycle having the crank assembly 62 constructed and arranged to allow a rider to provide input thereto using the first pedal assembly 66 and the second pedal assembly 70.

Figure 2:
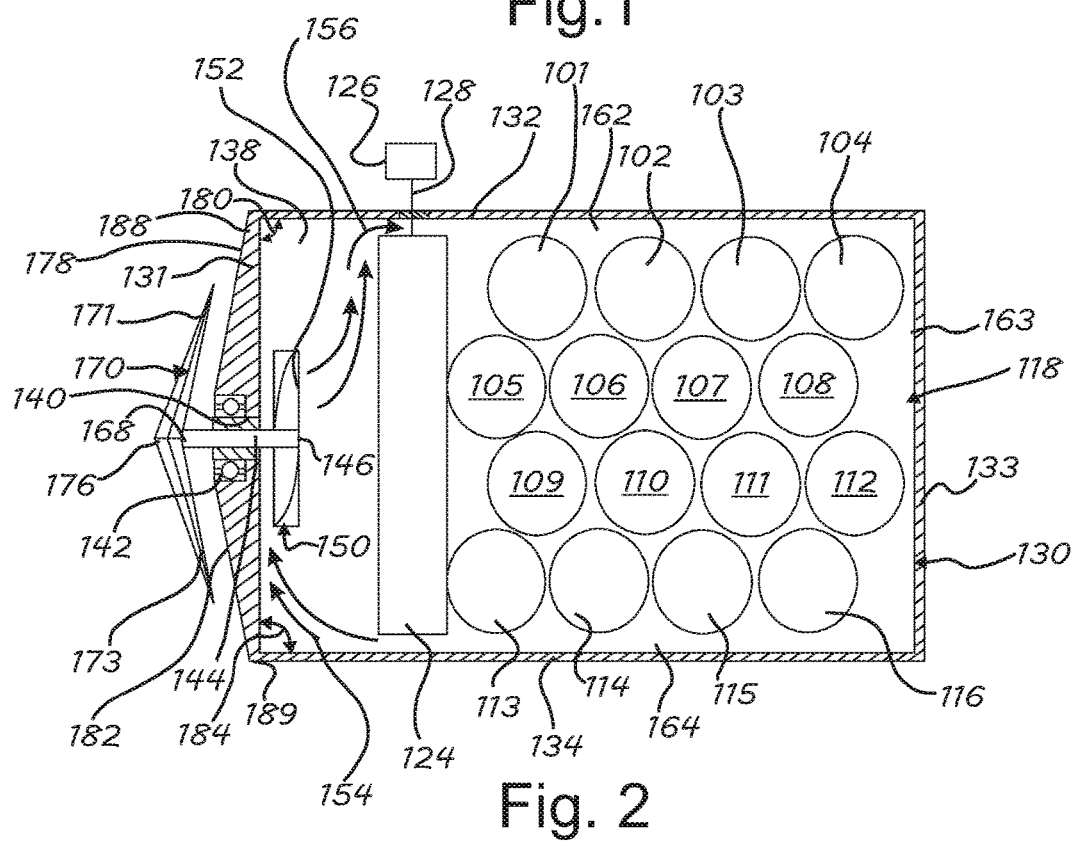
FIG. 2 illustrates a battery pack cross section for use with the cycle of FIG. 1 according to a number of variations.

In a number of variations as further illustrated in FIG. 2, the power unit 60 may include an electric motor that may also operate as a generator, and that may be powered by a battery or any number of batteries or battery assemblies. In a number of variations a battery assembly may include battery cells 101-116 that may each be part of battery set referred to as battery pack 118. The battery pack 118 may be disposed in a rectangular stack, or another arrangement to fit the space limitations and power requirements of the application. The battery pack 118 may be arranged in multiple rows of cells that may be offset from one another so that the cylindrical shaped cells 101-116 may be packed closer together. The circuit unit 124 may be positioned adjacent the battery pack 118 and may support a variety of control operations such as battery state monitoring, temperature, and/or sensor functions, and may provide conductors for interconnecting various elements. The circuit unit 124 may be interconnected through conductors (not shown), with the battery cells 101-116, and the power unit 60. Each of the battery cells 101-116, may have terminals on each of its ends that may be interconnected with bus bars (not shown), that may connect groups of cells with the circuit unit 124. The battery pack 118 may include one or more connectors 126 that may be connected with the cells 101-116 through a conductor 128 for supplying power to the power unit 60 and for charging the battery pack 118 from the power unit 60, or from an external electric source.

In a number of variations the battery pack 118 may be arranged in a housing 130. The housing 130 may be provided in a shape that fits over the battery pack 118. The housing 130 may include six sides including sides 131-134, along with two additional sides 135 and 136 (shown in FIG. 3). The sides 132-136 may be completely closed walls and may be positioned adjacent the battery pack 118. The side 131 may be spaced apart from the battery pack 118 forming a plenum space 138 that may be open. The circuit unit 124 may be positioned between the battery cells 101-116 and the plenum space 138.

In a number of variations, the side 131 may provide an end wall and may include an opening 140 containing a bearing assembly 142. A shaft 144 may extend through the opening 140 and may be supported on the side 131 to rotate relative thereto through operation of the bearing assembly 142. The shaft 144 may extend into the plenum space 138 and may have an end 146 disposed therein. An impeller 150, with a number of blades 152 may be fixed on or near the end 146 of the shaft 144 to rotate therewith. When rotated, the impeller 150 may increase the air flow rate in the housing 130 resulting in increased circulation over the battery cells 101-116, the circuit unit 124 and any other internal components. The circuit unit 124 may be positioned between the battery cells 101-116 and the impeller 150 for optimal cooling. As a result of rotation of the impeller 150, convective heat transfer from the components of the battery pack 118 may be enhanced in a completely sealed unit. The blades 152 may be shaped to assist in inducing circulation and may effect axial flow, radial flow, or a combination thereof. In a number of variations the blades 152 may draw inflow 154 from under the battery pack 118 and may direct return flow 156 over the battery pack 118. The battery pack 118 may be spaced from the walls provided by the sides 132, 133 and 134, with gaps 162, 163 and 164 respectively, around the battery pack 118 for circulation. Supports (not shown), may be provided to hold the battery pack 118 in position in the housing 130.

Figure 3:
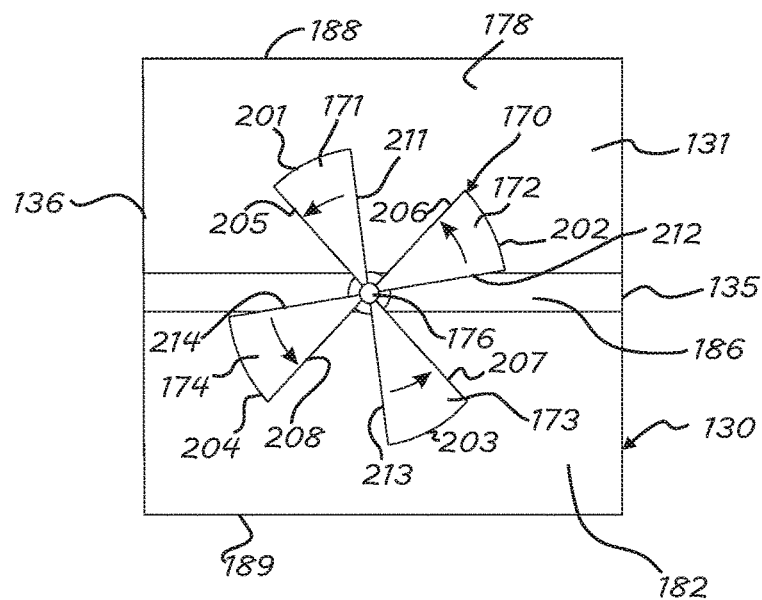
FIG. 3 illustrates a part of the battery pack cooling system of FIG. 2 according to a number of variations.

In a number of variations the shaft 144 may include an end 168 positioned outside the housing 130 for exposure to moving air outside the housing 130. A turbine 170 may be fixed on or near the end 168 to rotate with the shaft 144. Referring to FIG. 3 along with FIG. 2, the turbine 170 may have a number of blades 171-174, extending radially outward from a center hub 176. The blades 171-174 may extend from the center hub 176 at an incline that may be directed back toward the housing 130. The side 131 behind the turbine 170 may be similarly angled. The side 131 may include a section 178 that may be angled outward at an obtuse angle 180 relative to the side 132. The side 131 may include a section 182 that may be angled outward at an obtuse angle 184 relative to the side 134. The sections 178 and 182 may meet in a center of the side 131 at a section 186 that may be in line with the shaft 144. The section 186 may be further outward and away from the battery pack 118 than the ends 188, 189 respectively, of the sections 178, 182. Air movement over the blades 171-174 may induce rotation of the turbine 170, and the connected shaft 144, and as a result, the impeller 150. The angles 180, 184 of the sections 178, 182 respectively, may assist in air flow through the turbine 170 by directing air from behind the turbine 170 toward the ends 188, 189.

In a number of variations the blades 171-174 may each have a respective tip 201-204 located at the terminal ends of the blades 171-174 radially outward from the center hub 176. The blades 171-174 may be swept backward so that the tips 201-204 respectively, may be located further in the direction of the impeller 150 than the center hub 176 to maximize the driving action of air moving along the housing 130. Each of the blades 171-174 may have a leading edge 205-208 respectively, and a trailing edge 211-214, respectively. The leading edges 205-208 may be located further from the housing 130 than the trailing edges 211-214 so that the blades 171-174 may act as air foils to induce rotation of the turbine 170 as air moves toward the housing 130.

Figure 4:
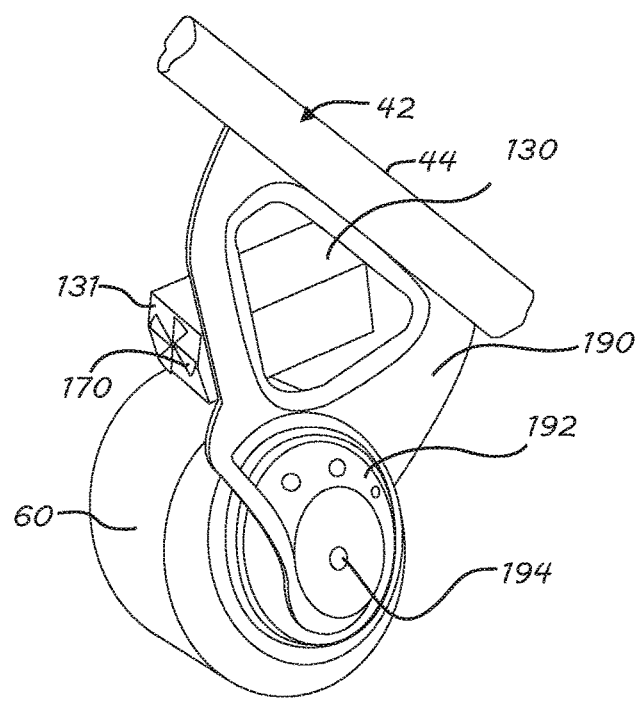
FIG. 4 illustrates part of the electric cycle of FIG. 1 in fragmentary perspective view according to a number of variations.

In a number of variations as illustrated in FIG. 4, the electric cycle 40 may include a bracket 190 fixed to the main tube 44 and/or the seat tube 46, or to another part of the frame 42, and may include a contoured portion 192 matching the exterior of the power unit 60. The bracket 190 may serve as a support and a coupling structure between the housing 130 and the electric cycle 40 as a vehicle. The bracket 190 may hold the power unit 60 relative to the frame 42. The crank assembly 62 (shown in FIG. 1), may connect at the opening 194. The battery pack 118 in the housing 130 may be mounted above the power unit 60. The connector 126 may be connected to a mating connector (not shown), of the power unit 60. The housing 130 may be mounted to the frame 42 so that the side 131 may be facing forward relative to the direction of forward operation of the electric cycle 40. As a result, oncoming air may impinge upon the turbine 170 to effect rotation thereof, as the electric cycle 40 travels forward. Because of the enhanced cooling provided, the housing 130 may be completely closed around the battery pack 122, except for entry of the shaft 144 and connector leads, so that it may be hermetically sealed meaning the entry of unwanted dust, water or other debris is blocked.

Through the variations described above, the range of an electric cycle 40 may be extended by unique cooling mechanisms providing reduced operating temperatures of the battery pack 118. With the cooling provided by the turbine 170 driven impeller 150, the number of cells required in the battery pack 118 may optionally be reduced to achieve a desired range. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a battery cell, and a housing may contain the battery cell. A cooling assembly may include an impeller that may circulate air in the housing. A turbine may be connected with the impeller so that the turbine and impeller may rotate together.

Variation 2 may include the product according to variation 1 wherein the impeller may be positioned inside the housing and the turbine may be positioned outside the housing.

Variation 3 may include the product according to variation 2 wherein the turbine may be connected with the impeller by a shaft supported on the housing and rotatable relative thereto.

Variation 4 may include the product according to variation 1 wherein the housing may define a plenum space that may be open and that may contain the impeller. A circuit unit may be positioned between the battery cell and the plenum space.

Variation 5 may include the product according to variation 1 wherein a side wall may be defined by the housing between the impeller and the turbine. The side wall may have a center section and a pair of ends located outward from the center section. The side wall may be sloped away from the turbine from the center section to each of the ends to move air from behind the turbine.

Variation 6 may include the product according to variation 5 and may include a shaft that may connect the turbine with the impeller. The turbine may include a number of blades with tips. Each blade may slope toward the housing from the shaft to the respective tip of the blade.

Variation 7 may include the product according to variation 1 and may include an electric cycle. The housing may be connected to the electric cycle so that the turbine may face in a forward direction that may correspond to a forward operation of the electric cycle. Forward operation of the electric cycle in the forward direction may induce rotation of the turbine and the impeller to cool the battery cell.

Variation 8 may involve a product that may include a battery pack that may contain a number of battery cells. A housing may receive the battery pack. A plenum space may be open and may be defined in the housing. An impeller may be positioned in the plenum space. A turbine may be positioned outside the housing and may be connected with the impeller so that rotation of the turbine may cause rotation of the impeller to circulate air in the housing.

Variation 9 may include the product according to variation 8 wherein the housing may include a wall. The turbine may be connected with the impeller by a shaft that may extend through the wall.

Variation 10 may include the product according to variation 9 wherein the housing may be completely sealed closed.

Variation 11 may include the product according to variation 8 and may include a circuit unit that may be positioned between the battery pack and the plenum space.

Variation 12 may include the product according to variation 8 wherein the only source of rotating action for the impeller may be the turbine.

Variation 13 may include the product according to variation 8 wherein a side wall may be defined by the housing and may be located between the impeller and the turbine. The side wall may have a center section and a pair of ends that may be located outward from the center section. The side wall may be sloped away from the turbine from the center section to each of the ends to move air from behind the turbine.

Variation 14 may include the product according to variation 13 and may include a shaft that may connect the turbine with the impeller. The turbine may include a number of blades with tips. Each blade may slope toward the housing from the shaft to the respective tip of the blade.

Variation 15 may involve a product that may include an electric cycle that may have a driven road wheel. A power unit may be connected to power the road wheel in at least a forward direction. A battery pack may be connected to the power unit as a source of electric power. An impeller may be positioned to circulate air over the battery pack. A turbine may be connected with the impeller so that operation of the electric cycle in the forward direction may cause air to move over the turbine inducing rotation thereof. The turbine may provide the only motive force to rotate the impeller.

Variation 16 may include the product according to variation 15 wherein the electric cycle may include a frame and a crank. Pedals may provide manual operation of the electric cycle. The crank may connect at the power unit. The battery pack may be mounted over the power unit with the turbine facing in the forward direction.

Variation 17 may include the product according to variation 15 and may include a housing that may contain the battery pack. A plenum area may be defined in the housing and may contain the impeller. The turbine may be positioned outside the housing.

Variation 18 may include the product according to variation 17 wherein the circuit unit may be positioned between the battery pack and the plenum area.

Variation 19 may include the product according to variation 17 wherein a side wall may be defined by the housing between the impeller and the turbine. The side wall may have a center section and a pair of ends located outward from the center section. The side wall may be sloped away from the turbine from the center section to each of the ends to move air from behind the turbine.

Variation 20 may include the product according to variation 19 and may include a shaft that may connect the turbine with the impeller. The turbine may include a number of blades with tips. Each blade may slope toward the housing from the shaft to the respective tip of the blade.

The above description of select variations within the scope of the invention is merely illustrative in nature and, thus, variations or variants thereof are not to be regarded as a departure from the spirit and scope of the invention.

What is claimed is:
1. A product comprising:
 a battery cell;
 a housing containing the battery cell and including a side wall that is closed and faces in a forward direction relative to operation of the product; and
 a cooling assembly comprising an impeller disposed in the housing and configured to circulate air in the housing and a turbine disposed outside the housing and configured to be driven by air movement,
wherein the impeller includes a number of blades configured to draw inflow and direct return flow over the battery pack,
wherein the turbine is connected with the impeller through the side wall so that the turbine and impeller rotate together in response to the air movement.

2. The product according to claim 1 wherein the housing is completely closed to prevent the entry of debris.

3. The product according to claim 2 wherein the turbine is connected with the impeller by a shaft supported on the housing, extending through the side wall, and rotatable relative thereto.

4. The product according to claim 1 wherein the housing defines a plenum space that is open and that contains the impeller, and comprising a circuit unit positioned behind the side wall and between the battery cell and the plenum space.

5. The product according to claim 1 wherein the side wall has a center section and a pair of ends located outward from the center section and wherein the side wall is sloped away from the turbine from the center section to each of the ends, and is configured to move air from behind the turbine.

6. The product according to claim 5 comprising a shaft connecting the turbine with the impeller and extending through the side wall, wherein the turbine includes a number of tips, wherein the turbine slopes toward the housing from the shaft to the tips.

7. The product according to claim 1 comprising an electric cycle, wherein the housing is connected to the electric cycle so that the turbine faces in the forward direction corresponding to a forward operation of the electric cycle, wherein the forward operation of the electric cycle in the forward direction induces rotation of the turbine and the impeller to cool the battery cell.

8. A product comprising:
a housing that is at least substantially closed to inhibit the entry of debris into the housing;
a battery contained in the housing;
an impeller disposed in the housing and configured to circulate air contained in the housing over the battery, wherein the impeller includes a number of blades configured to draw inflow from within the housing and direct return flow over the battery pack; and
a turbine configured to rotate in response to air movement and disposed outside the housing, the turbine connected with the impeller to drive the impeller when the turbine rotates.

9. The product according to claim 8 wherein the housing includes a side wall that closes a front side of the housing, and wherein the turbine is connected with the impeller by a shaft that extends through the side wall.

10. The product according to claim 9 wherein the housing is completely sealed closed to prevent the entry of dust, water and the debris into the housing so that the impeller circulates air that is free of the dust, the water and the debris over the battery.

11. The product according to claim 9 comprising a circuit unit positioned between the battery pack and the side wall.

12. The product according to claim 8 wherein the only source of rotating action for the impeller is the turbine and wherein the impeller is configured, only, to circulate air in the housing.

13. The product according to claim 8 wherein a side wall is defined by the housing between the impeller and the turbine and wherein the side wall has a center section and a pair of ends located outward from the center section and wherein the side wall is sloped away from the turbine from the center section to each of the ends and is configured to move air from behind the turbine.

14. The product according to claim 13 comprising a shaft connecting the turbine with the impeller and extending through the side wall, wherein the turbine includes a number of tips, wherein the turbine slopes toward the housing from the shaft to the tips.

15. A product comprising an electric cycle having a frame supported on a road wheel that is driven, a power unit connected to power the road wheel in at least a forward direction, a battery pack connected to the power unit as a source of electric power, a housing that contains the battery pack and that is sealed closed, an impeller positioned to circulate air contained in the housing over the battery pack, and a turbine disposed outside the housing and connected with the impeller so that operation of the electric cycle in the forward direction causes air to move over the turbine inducing rotation thereof, and providing the only motive force to rotate the impeller, wherein the impeller is configured to draw inflow from within the housing and direct return flow over the battery pack.

16. The product according to claim 15 wherein the electric cycle includes a frame and a crank with pedals providing manual operation of the electric cycle, wherein the crank connects at the power unit and wherein the housing is mounted to the frame and is disposed over the power unit with the turbine facing in the forward direction.

17. The product according to claim 15 wherein the housing is sealed closed and defines a plenum area containing air, wherein the impeller is disposed in the plenum area.

18. The product according to claim 17 wherein the housing has a side wall facing in the forward direction, wherein the circuit unit is positioned between the battery pack and the side wall, and comprising a shaft extending through the side wall and connecting the turbine to the impeller.

19. The product according to claim 17 wherein a side wall is defined by the housing between the impeller and the turbine and wherein the side wall faces in the forward direction and closed a front of the housing so that air driving the turbine does not enter the housing, wherein the side wall has a center section and a pair of ends located outward from the center section and wherein the side wall is sloped away from the turbine from the center section to each of the ends to move air from behind the turbine.

20. The product according to claim 15 comprising a shaft that includes a first end positioned outside the housing for exposure to moving air outside the housing and a second end disposed inside the housing, the turbine includes a center hub with extending blades and is fixed at the first end, the impeller is fixed at the second end, the blades extend at an incline directed toward the side wall and are swept in a backward direction with the tips located further toward the impeller than the center hub, the side wall is angled to accommodate the incline, the turbine is configured so that air movement over the blades induces rotation of the turbine and the connected impeller, the housing is mounted to the frame so that the side wall faces in the forward direction and as a result, oncoming air impinges on the turbine to effect rotation thereof as the electric cycle travels forward enabling the housing to be completely closed around the battery pack and the housing is sealed meaning the entry of unwanted dust, water or other debris is blocked.

* * * * *